(12) United States Patent
Saieg et al.

(10) Patent No.: US 7,726,673 B2
(45) Date of Patent: *Jun. 1, 2010

(54) CAST TRAILING ARM ASSEMBLY FOR TRAILER SUSPENSION

(75) Inventors: Steven George Saieg, Rochester Hills, MI (US); Craig Allen Holt, Chesterfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 314 days.

This patent is subject to a terminal disclaimer.

(21) Appl. No.: 11/875,139

(22) Filed: Oct. 19, 2007

(65) Prior Publication Data

US 2008/0029988 A1 Feb. 7, 2008

Related U.S. Application Data

(63) Continuation-in-part of application No. 11/016,297, filed on Dec. 17, 2004, now Pat. No. 7,360,774, which is a continuation-in-part of application No. 10/916,127, filed on Aug. 11, 2004.

(51) Int. Cl.
*B60G 7/00* (2006.01)

(52) U.S. Cl. .................... 280/124.128; 280/124.13; 280/124.116

(58) Field of Classification Search .......... 280/124.128, 280/124.13, 124.116, 124.129, 124.144, 280/124.153

See application file for complete search history.

(56) References Cited

U.S. PATENT DOCUMENTS

| | | | | |
|---|---|---|---|---|
| 5,690,353 A | * | 11/1997 | Vandenberg | 280/124.116 |
| 6,241,266 B1 | * | 6/2001 | Smith et al. | 280/124.116 |
| 6,557,875 B2 | * | 5/2003 | Schlosser et al. | 280/124.153 |
| 7,048,288 B2 | * | 5/2006 | Chan et al. | 280/124.116 |
| 7,086,655 B2 | * | 8/2006 | Chan et al. | 280/124.116 |
| 2003/0146592 A1 | * | 8/2003 | Chalin et al. | 280/124.116 |
| 2004/0080132 A1 | * | 4/2004 | Chan et al. | 280/124.11 |
| 2004/0183271 A1 | * | 9/2004 | Galazin et al. | 280/124.128 |

FOREIGN PATENT DOCUMENTS

| | | | | |
|---|---|---|---|---|
| GB | 2367272 A | * | 4/2002 | |
| GB | 2367273 A | * | 4/2002 | |
| GB | 2396140 A | * | 6/2004 | |

* cited by examiner

*Primary Examiner*—Ruth Ilan
(74) *Attorney, Agent, or Firm*—Carlson, Gaskey & Olds (57) ABSTRACT

A trailing arm assembly for a suspension includes first and second axle wraps. The first and second axle wraps are welded to each other to substantially surround an outer perimeter of an axle member. The first axle wrap is then welded to one side of the axle member at a first weld area and the second axle wrap is welded to an opposite side of the axle member at a second weld area. The first axle wrap includes a spring seat and the second axle wrap includes an arm body with a bushing receiver portion at one arm end. A bushing tube attached to the bushing receiver portion. The first weld area comprises a single window weld and the second weld area comprises first and second window welds that are positioned on opposing sides of the arm body.

20 Claims, 7 Drawing Sheets

CAST TRAILING ARM ASSEMBLY FOR TRAILER SUSPENSION

RELATED APPLICATION

This application is a continuation-in-part of U.S. application Ser. No. 11/016,297, filed Dec. 17, 2004 now U.S. Pat. No. 7,360,774, which was a continuation-in-part of U.S. application Ser. No. 10/916,127 filed Aug. 11, 2004.

TECHNICAL FIELD

The subject invention relates to a trailing arm assembly for a suspension that includes two cast components that are welded to an axle member and a bushing tube that is supported by one of the cast components.

BACKGROUND OF THE INVENTION

A suspension system includes a pair of trailing arm assemblies that are attached to an axle beam member. One trailing arm assembly is positioned near one end of the axle beam member, and another trailing arm assembly is positioned near an opposite end of the axle beam member. The trailing arm assemblies are pivotally connected to a vehicle frame member at a first end and support air springs at a second end. The trailing arm assemblies are attached to the axle beam member at a position between the first and second ends. The trailing arm assemblies need to be lightweight and must be capable of operating under high load conditions.

Traditionally, each trailing arm assembly is manufactured from a plurality of stamped pieces of sheet metal that are welded together, and which are welded to the axle beam member. Depending on the type of trailing arm assembly, as many as ten (10) or more pieces are required to form each trailing arm assembly. Performing the welding operations to attach these pieces together is an expensive and time-consuming process. Further, each weld joint area provides a potential failure initiation point. Improperly welded joints can result in premature cracking and joint failure due to shock loads or overloading.

Thus, it is desirable to provide a trailing arm assembly for a suspension that is lightweight and high strength and that reduces the number of welded joint areas. The trailing arm assembly should also have fewer components and be less time consuming to assemble, as well as overcoming the other above-mentioned deficiencies in the prior art.

SUMMARY OF THE INVENTION

A trailing arm assembly for a suspension includes a first axle wrap, a second axle wrap, and a bushing tube. The first axle wrap defines a first window weld area and includes a first axle receiver portion and a spring seat. The second axle wrap defines a second window weld area and includes an arm body with a bushing receiver portion formed at one end and a second axle receiver portion formed at an opposite end. The second window weld area includes a first window weld positioned on one side of the arm body and a second window weld positioned on an opposite side of the arm body.

In one example, the first and second axle wraps are first welded to each other, and then are subsequently welded to an axle component via the first and second window weld areas. The bushing tube is then welded to the second axle wrap. In one example, the first window weld area comprises a single window weld that is positioned axially between the first and second window welds of the second window weld area.

In one example, the arm body of the second axle wrap comprises a box-shaped structure that has an upper wall, a lower wall, an inboard side wall extending from one edge of the upper wall to one edge of the lower wall, and an outboard side wall extending from an opposite edge of the upper wall to an opposite edge of the lower wall. The second axle receiver portion has an inboard portion that extends inwardly away from the inboard side wall, and an outboard portion that extends outwardly away from the outboard side wall. The first window weld is formed within the inboard portion, and the second window weld is formed within the outboard portion.

In one example, the second axle wrap includes a shock absorber side mount portion. The shock absorber side mount portion includes bore that extends through the arm body from the inboard side wall to the outboard side wall. A fastener extends into bore and fastens the arm body to a shock absorber.

The subject invention provides a lightweight and high strength trailing arm assembly having fewer components, and which is less expensive and time consuming to assemble compared to prior designs. These and other features of the present invention can be best understood from the following specification and drawings, the following of which is a brief description.

DETAILED DESCRIPTION OF THE PREFERRED EMBODIMENT

Figure 1:
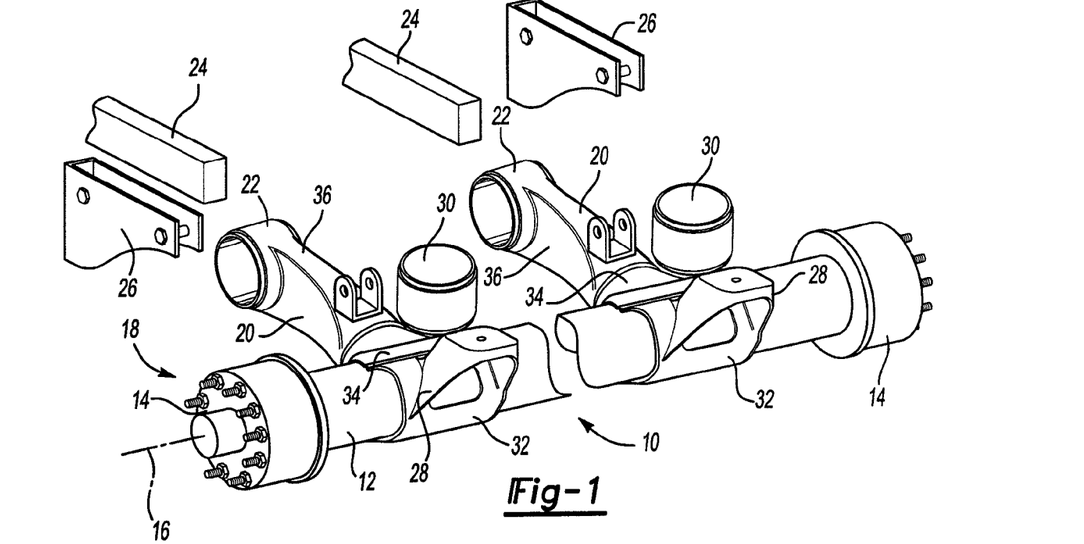
FIG. 1 is a perspective view of an axle and pair of trailing arm assemblies incorporating the subject invention.

An axle assembly 10 is shown in FIG. 1. The axle assembly includes an axle beam 12 extending laterally between a pair of wheel ends 14. The axle beam 12 defines a lateral axis of rotation 16. The wheel ends 14 support tires (not shown) that rotate about the lateral axis of rotation 16.

The subject invention provides a suspension assembly, shown generally at 18, that includes a pair of unique trailing arms 20 that are laterally spaced apart from each other. Each trailing arm 20 includes a first end 22 that is pivotally connected to a vehicle frame member 24 with a connector assembly 26, and a second end 28 that supports a suspension component 30.

In one example, the axle beam 12 is a tube for a trailer axle assembly, however, it should be understood that the suspension assembly 18 with the unique trailing arms 20 could also benefit suspensions for other axles such as drive or non-drive steer axles, single drive axles, tandem drive axles, tag axles, etc. When used with a trailer axle assembly, the vehicle frame member 24 is a trailer frame member, the connector assembly 26 is typically a frame bracket assembly, and the suspension component 30 is typically an air spring. It should be understood that the connector assembly 26 and suspension component 30 are just examples, and that other connector configurations and suspension components known in the art could be used in place of the drop link assembly and air spring. Further, the suspension assembly 18 includes additional components to complete the suspension assembly 18 that are not shown, but are well known in the art.

Figure 2:
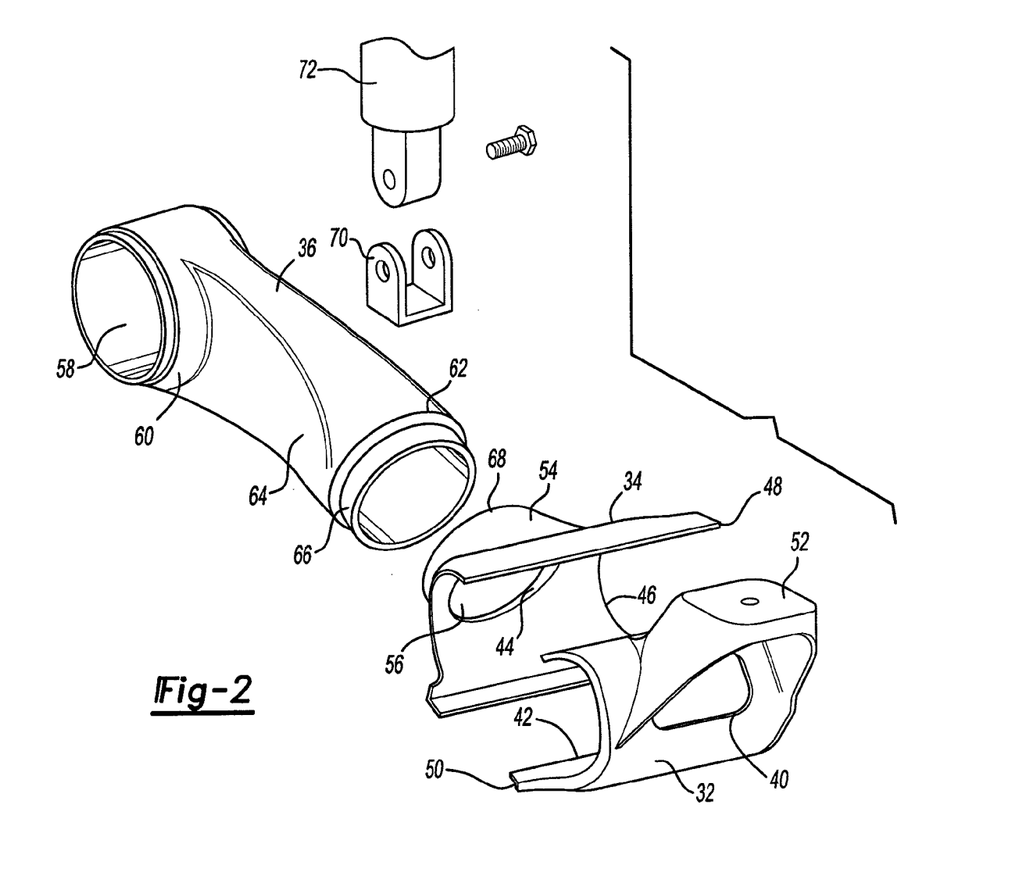
FIG. 2 is an exploded view of one trailing arm assembly from FIG. 1.
Figure 3:
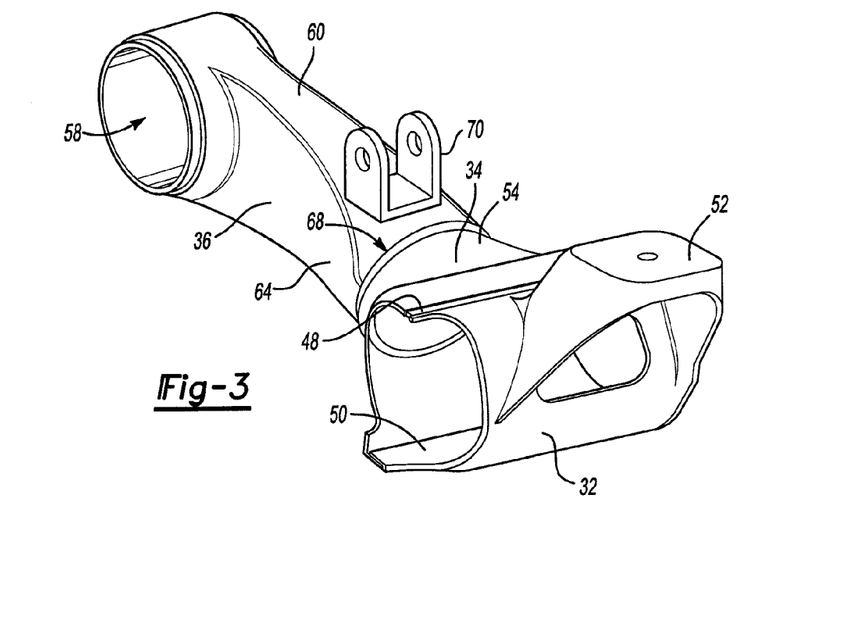
FIG. 3 is a perspective view of the trailing arm assembly of FIG. 2.

In the example shown in FIGS. 1-3, each trailing arm 20 includes a first cast component 32, a second cast component 34, and a third cast component 36. The first 32 and second 34 cast components are welded to each other and then are separately welded to the axle beam 12. The first 32 and second 34 cast components substantially surround the axle beam 12 after welding. The third cast component 36 is then welded to the second cast component 34.

The first 32, second 34, and third 36 cast components are shown in greater detail in FIGS. 2 and 3. The first 32 and second 34 cast components include weld areas for attachment to the axle beam 12. Any type of welded joint or welding process known in the art can be used to attach the weld areas to the axle beam 12. In one example, the first cast component 32 includes a first window weld area 40 and defines an inner surface 42 that substantially surrounds one side of the axle beam 12. The second cast component 34 includes a second window weld area 44 and defines an inner surface 46 that substantially surrounds an opposite side of the axle beam 12. The first 32 and second 34 cast components are welded to each other at 48, 50. The first cast component 32 is then welded to the axle beam 12 via the first window weld area 40, and the second cast component 34 is welded to the axle beam 12 via the second window weld area 44. Throughout this application, it should be understood that the window welds preferably extend all around the periphery of the openings. However, other weld joints would come within the definition of a window weld.

The first cast component 32 includes an integrally formed air spring seat 52 that supports the suspension component 30. The second cast component 34 includes an integrally formed tubular portion 54 that defines an opening 56. The third cast component 36 includes a bushing housing 58 that is integrally formed at one end 60 and a tubular portion 62 that is integrally formed at an opposite end 64. The tubular portion 62 includes a reduced diameter area 66 that has a smaller diameter than opening 56.

The second window weld area 44 is accessible through the opening 56. Once the second cast component 34 is welded to the axle beam 12, the third cast component 36 is welded to the second cast component 34. More specifically, the reduced diameter area 66 is inserted into the opening 56, and the tubular portions 54, 62 are welded together at 68.

A shock absorber bracket 70 is then welded to the third cast component 36. The shock absorber bracket 70 mounts a shock absorber 72 between the connector assembly 26 and the suspension assembly 18 as known.

Figure 4:
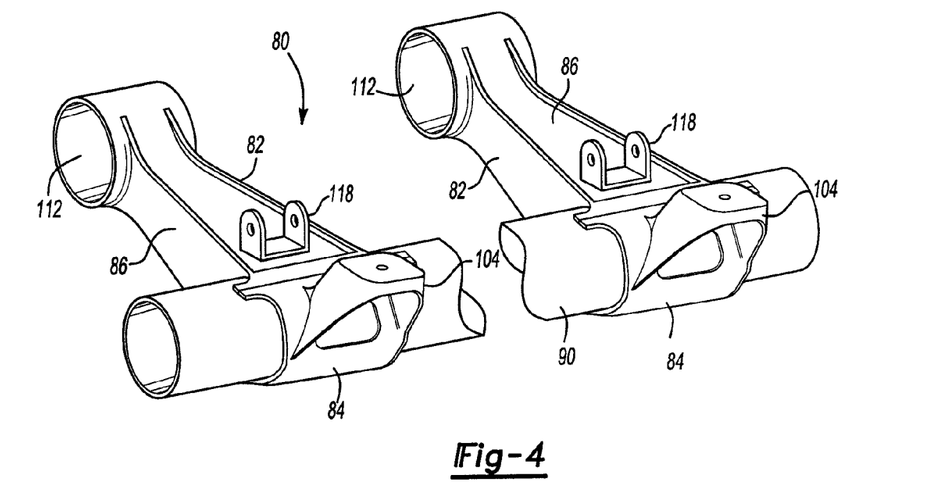
FIG. 4 is a perspective view of another example of an axle and pair of trailing arm assemblies incorporating the subject invention.
Figure 5:
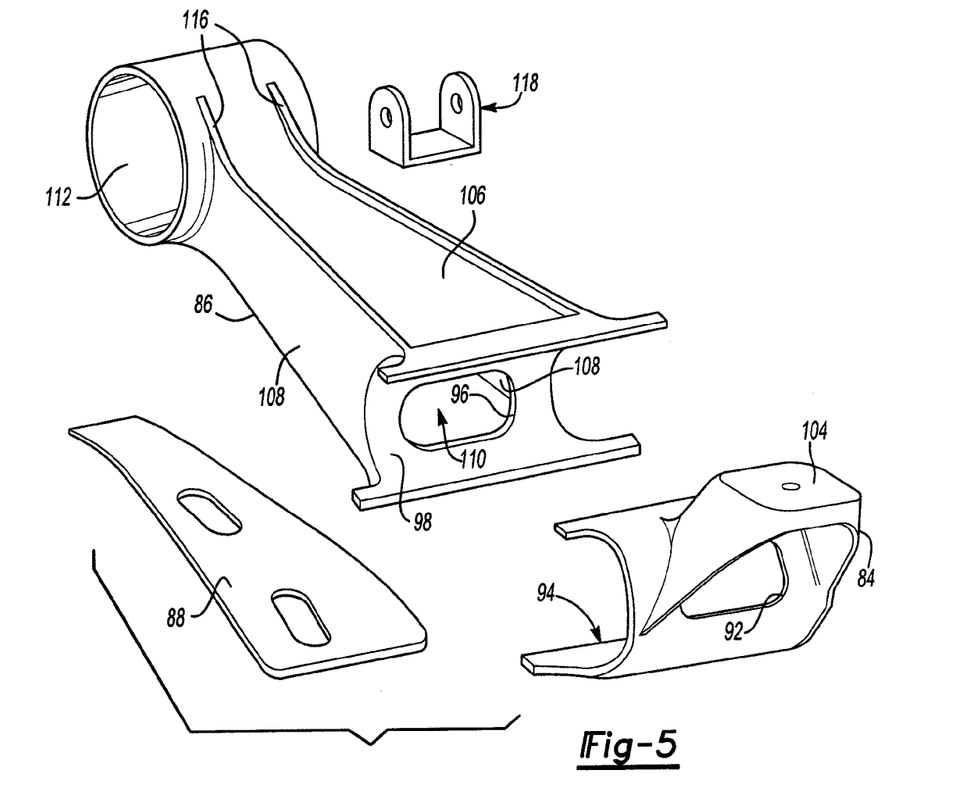
FIG. 5 is an exploded view of one trailing arm assembly from FIG. 4.
Figure 6:
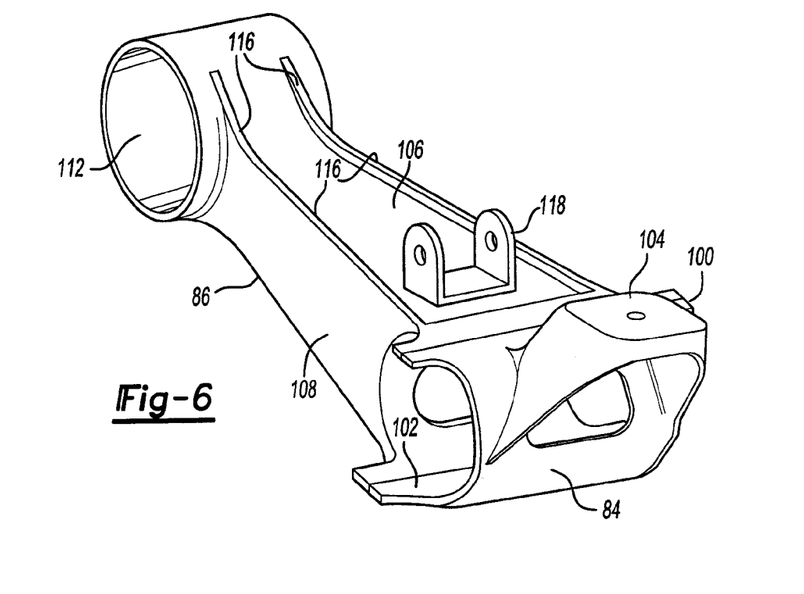
FIG. 6 is a perspective view of the trailing arm assembly of FIG. 5.

Another example of a suspension assembly is shown in FIGS. 4, 5, and 6. The suspension assembly 80 is similar to the suspension assembly 18 shown in FIG. 1, except the trailing arms 82 are different than the trailing arms 20.

Each trailing arm 82 includes a first cast component 84, a second cast component 86, and a bottom plate 88. The first 84 and second 86 cast components are first welded to each other. The first 84 and second 86 cast components are then welded to an axle beam 90. The first 84 and second 86 cast components substantially surround the axle beam 90 after welding. The bottom plate 88 is then welded to the second cast component 86.

The first 84 and second 86 cast components and the bottom plate 88 are shown in greater detail in FIGS. 5 and 6. The first 84 and second 86 cast components include weld areas for attachment to the axle beam 90. Again, any known type of welded joint or welding process can be used to join the weld areas to the axle beam 90. In one example, the first cast component 84 includes a first window weld area 92 and defines an inner surface 94 that substantially surrounds one side of the axle beam 90. The second cast component 86 includes a second window weld area 96 and defines an inner surface 98 that substantially surrounds an opposite side of the axle beam 90. The first 84 and second 86 cast components are first welded to each other at 100, 102. The first cast component 84 is then welded to the axle beam 90 via the first window weld area 92, and the second cast component 86 is welded to the axle beam 90 via the second window weld area 96.

The first cast component 84 includes an integrally formed air spring seat 104 that supports a suspension component, such as an air spring. The second cast component 86 includes an upper surface 106 that faces a vehicle frame member, a pair of vertical side walls 108 extending downwardly from opposing edges of the upper surface 106, and an open bottom that defines an internal cavity 110. The second cast component 86 also includes a bushing housing 112 that is integrally formed at one end. The bushing housing 112 is pivotally connected to the vehicle frame member 24, as shown in FIG. 1.

The second window weld area 96 is accessible through the internal cavity 110. Once the second cast component 86 is welded to the axle beam 90, the bottom plate 88 is welded to the second cast component 86. The bottom plate 88 is preferably a stamped piece of sheet metal. The cast components in each of the configurations shown in FIGS. 1-6 are preferably cast steel. Any type of steel can be used, with the grade of steel being determined by vehicle application, suspension type, strength and structural requirements, and/or other factors known in the art.

In the configuration shown in FIGS. 4-6, the second cast component 86 includes flanges 116 that extend upwardly from the opposing edges of the upper surface 106. A generally flat surface is formed between the flanges 116. A shock absorber bracket 118 is then welded to the second cast component 86 at the generally flat surface. The flanges 116 help reduce stress and provide clearance for a shock absorber.

Another example configuration is shown in FIGS. 7-12. A trailing arm and axle assembly is shown generally at 200 in FIG. 7. The trailing arm and axle assembly 200 includes an axle beam 202 that defines a lateral axis 204 extending between a pair of vehicle wheels (not shown). First 206 and second 208 trailing arm assemblies are laterally spaced apart from each other along the lateral axis 204.

Figure 7:
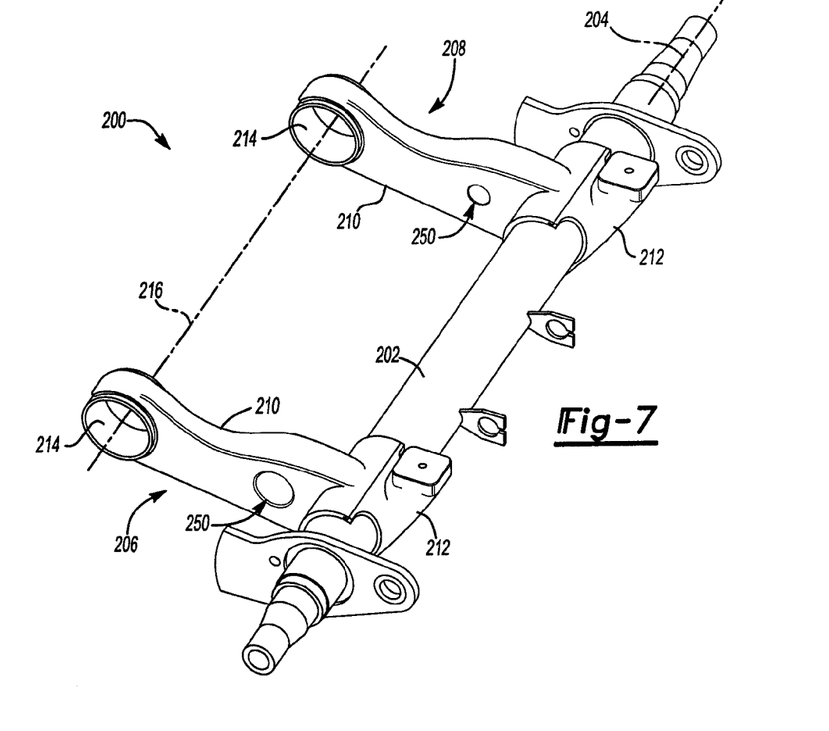
FIG. 7 is a perspective view of another example of an axle and pair of trailing arm assemblies incorporating the subject invention.

The first 206 and second 208 trailing arm assemblies each include a front suspension arm 210 and a rear suspension arm 212 that are cast components. A bushing tube 214 is mounted to each front suspension arm 210. The bushing tube 214 mounts the first 206 and second 208 trailing arm assemblies to a suspension frame bracket assembly or vehicle mount, which is connected to a vehicle or trailer frame member as described above. The bushing tube 214 defines a central bushing axis 216 that is generally parallel to the lateral axis 204.

Figure 8:
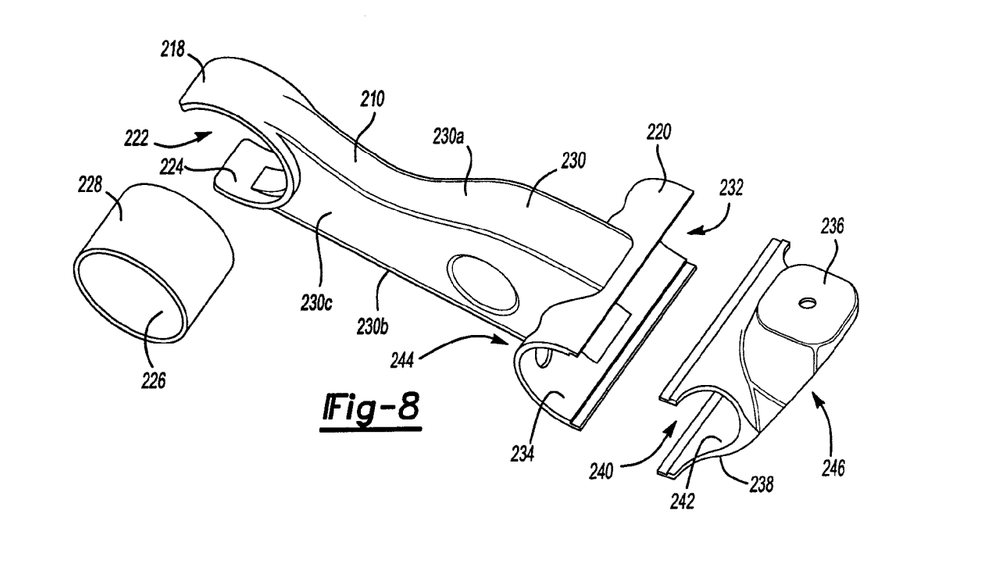
FIG. 8 is an exploded view of one trailing arm assembly from FIG. 7

As shown in FIG. 8, the front suspension arm 210 includes a bushing receiver portion 218 and an axle receiver portion 220. The bushing receiver portion 218 is connected to the bushing tube 214, and the axle receiver portion 220 is connected to the axle beam 202. The bushing receiver portion 218 includes a recess 222 defined by an arcuate surface 224 that extends less than 360° about the central bushing axis 216. The bushing tube 214 includes an inner peripheral surface 226 and an outer peripheral surface 228 that each extend 360° about the central bushing axis 216. The arcuate surface 224 and the outer peripheral surface 228 are positioned in abutting engagement, and the front suspension arm 210 and the bushing tube 214 are then attached to each other. Preferably, the front suspension arm 210 and bushing tube 214 are welded together, however, other known attachment methods could also be used.

The front suspension arm 210 includes an arm body 230 that extends from the axle receiver portion 220 to the bushing receiver portion 218. The arm body 230 is transverse to the lateral axis 204 and the central bushing axis 216. The axle receiver portion 220 includes a recess 232 with an inner peripheral surface 234 that extends less than 360° about the lateral axis 204. The inner peripheral surface 234 is abutted against the axle beam 202.

Figures 9, 10, 11, 12:
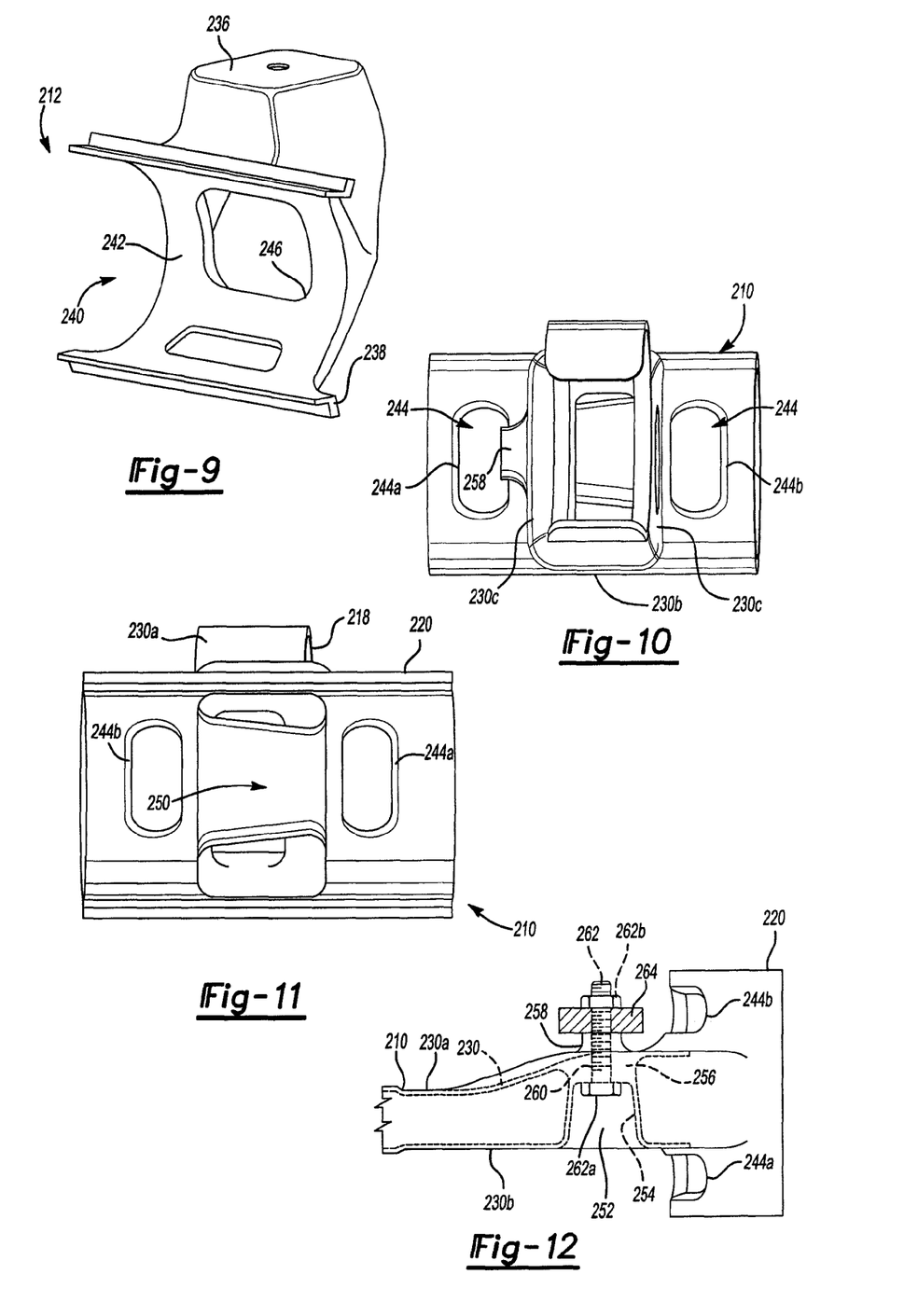
FIG. 9 is a perspective front view of a rear arm of the trailing arm assembly from FIG. 8.
FIG. 10 is a front end view of a front arm of the trailing arm assembly from FIG. 8.
FIG. 11 is a rear end view of the front arm of FIG. 10.
FIG. 12 is a top view of the trailing arm assembly from FIG. 8 shown in partial cross-section.

As shown in FIGS. 8 and 9, the rear suspension arm 212 includes an integrally formed spring seat portion 236 for supporting a suspension air spring and an axle receiver portion 238. The axle receiver portion 238 includes a recess 240 with an inner peripheral surface 242 that extends less than 360° about the lateral axis 204. The inner peripheral surface 242 is abutted against the axle beam 202.

The front suspension arm 210 includes a front window weld area 244 formed within the axle receiver portion 220. The rear suspension arm 212 includes a rear window weld area 246 formed within the axle receiver portion 238. The front 210 and rear 212 suspension arms are first welded to each other, and then are subsequently welded to the axle beam 202 via the front 244 and rear 246 window weld areas. The bushing tube 214 is then welded to the front suspension arm 210.

The position of the bushing tubes 214 should be tightly controlled, thus the bushing tubes 214 are welded on last to compensate for any misalignment in the suspension. This eliminates the need for machining the axle beam 202, which allows the use of a thinner wall axle tube.

In the example shown in FIG. 9, the rear window weld area 246 is a single window weld area. In the example shown in FIG. 10, the front window weld area 244 includes a first window weld area 244a and a second window weld area 244b. The first 244a and second 244b window weld areas are laterally spaced apart from each other along the lateral axis 204 and are positioned on laterally opposite sides of the arm body 230. When attached to the axle beam 202, the rear window weld area 246 is positioned generally between the first 244a and second 244b window weld areas.

The use of two (2) window welds on opposite sides of the arm body 230 reduces twisting moment that would be generated by having one offset window weld area on the front suspension arm 210. The rear suspension arm 212, with the spring seat portion 236, has a centrally positioned window weld area. This unique configuration provides flexibility of changing from a top mount suspension to a low mount suspension by simply using a different rear casting for the rear suspension arm 212. The front casting for the front suspension arm 210 and the bushing tube 214 can be used for either configuration.

The trailing arm and axle assembly 200 includes an optional side shock absorber mount, shown generally at 250 in FIG. 7. The side shock absorber mount 250 is formed within the front suspension arm 210. The arm body 230 of the front suspension arm 210 is defined by an upper wall 230a, a lower wall 230b, and side walls 230c (FIG. 8). The arm body 230 is generally hollow and includes openings to the bushing receiver portion 218 and the axle receiver portion 220.

The side shock absorber mount 250 is shown in greater detail in FIGS. 11 and 12. The side shock absorber mount 250 includes a recess 252 that extends into one of the side walls 230c. The recess 252 is defined by a frustro-conical surface 254 that extends from an opening in one side wall 230c to a base mount 256 located within the arm body 230. A lip or mounting surface 258 extends outwardly from the other side wall 230c, as shown in FIG. 12. An opening 260 extends from the base mount 256 through the mounting surface 258. A fastener 262 is received within the recess 252 and extends through the opening 260. In the example shown, the fastener 262 is a threaded bolt 262a and nut 262b. A shock absorber mount portion 264 is secured to the front suspension arm 210 at the mounting surface 258 with the fastener 262 as shown.

Thus, the side shock absorber mount 250 is incorporated into a casting for the front suspension arm 210 and does not require any additional pieces to be welded to the front suspension arm 210. The frustro-conical cross-section increases section strength and allows for a shorter fastener. By extending the recess 252 into the side wall 230c, a closed section is formed for that provides a closed section for attaching the nut 262b to the threaded bolt 262a. The closed section helps prevent contamination, which can lead to corrosion and premature wear or failure.

Figure 13:
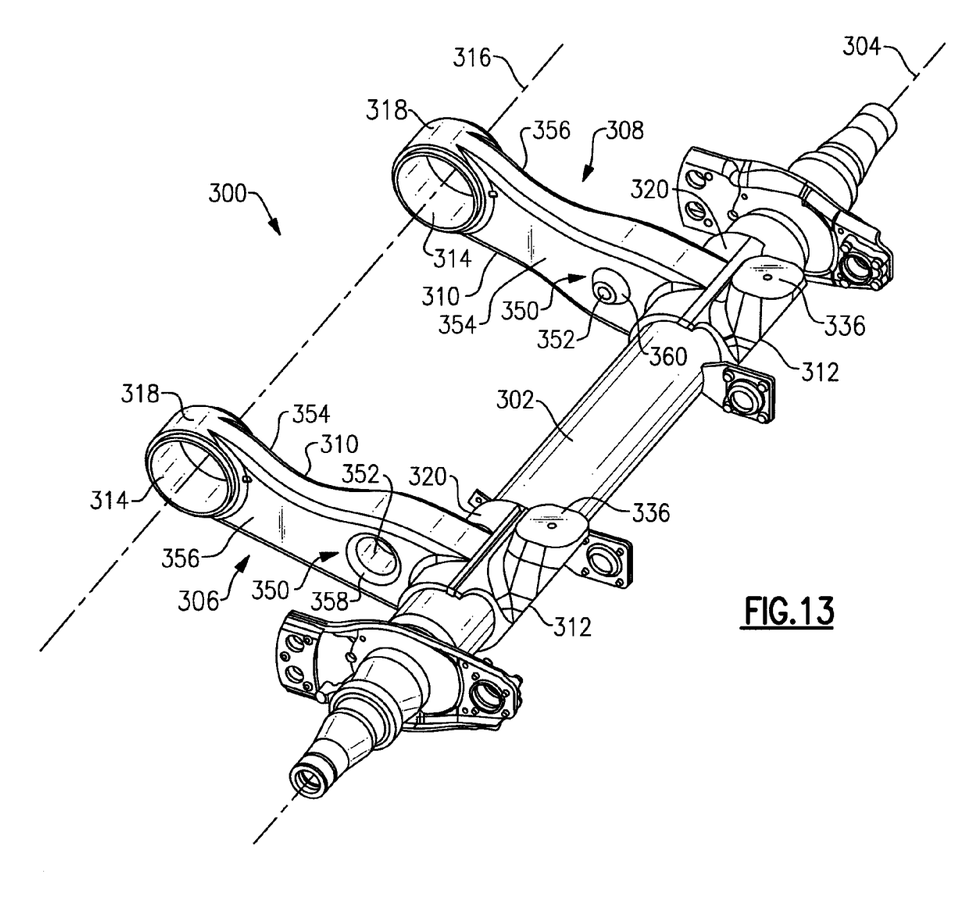
FIG. 13 is a perspective view of another example of an axle and pair of trailing arm assemblies incorporating the subject invention.
Figure 14:
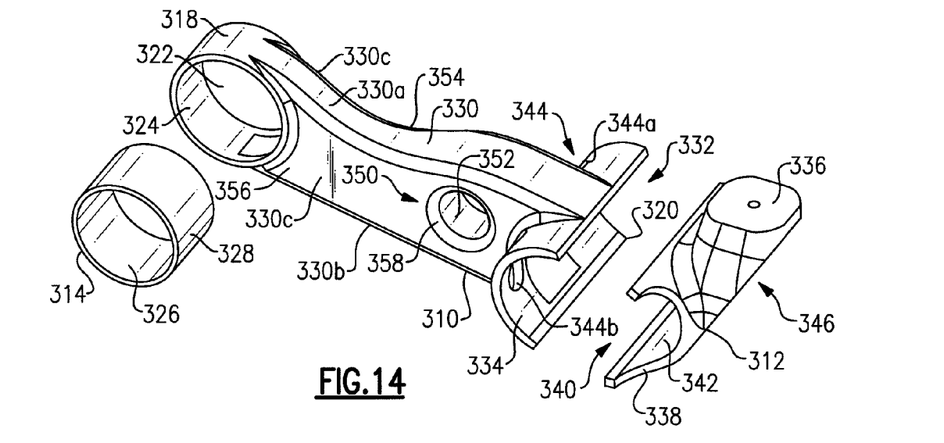
FIG. 14 is an exploded view of one trailing arm assembly from FIG. 13.
Figure 15:
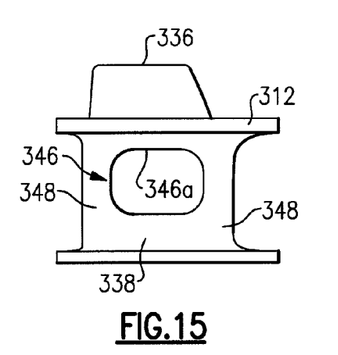
FIG. 15 is an end view of a cast component from the trailing arm assembly of FIG. 14.

Another example configuration is shown in FIGS. 13-15. A trailing arm and axle assembly is shown generally at 300 in FIG. 13. The trailing arm and axle assembly 300 includes an axle beam 302 that defines a lateral axis 304 extending between a pair of vehicle wheels (not shown). First 306 and second 308 trailing arm assemblies are laterally spaced apart from each other along the lateral axis 304.

The first 306 and second 308 trailing arm assemblies each include a first axle wrap 312 and a second axle wrap 310. The first axle wrap 312 and the second axle wrap 310 are cast components. A bushing tube 314 is mounted to each second axle wrap 310. The bushing tube 314 mounts the first 306 and second 308 trailing arm assemblies to a suspension frame bracket assembly or vehicle mount, which is connected to a vehicle or trailer frame member as described above. The bushing tube 314 defines a central bushing axis 316 that is generally parallel to the lateral axis 304.

As shown in FIG. 14, the second axle wrap 310 includes a bushing receiver portion 318 and an axle receiver portion 320. The bushing receiver portion 318 is directly connected to the bushing tube 314, and the axle receiver portion 320 is directly connected to the axle beam 302. The bushing receiver portion 318 defines a bore 322 having an inner circumferential surface 324 that extends about the central bushing axis 316. The bushing tube 314 includes an inner peripheral surface 326 and an outer peripheral surface 328 that each surrounds the central bushing axis 316. The inner circumferential surface 324 and the outer peripheral surface 328 are positioned in direct abutting engagement, and the second axle wrap 310 and the bushing tube 314 are then attached to each other. In one example, the second axle wrap 310 and bushing tube 314 are welded together, however, other attachment methods could also be used, such as a press-fit for example.

The second axle wrap 310 includes an arm body 330 that extends from the axle receiver portion 320 to the bushing receiver portion 318. The arm body 330 is transverse to the lateral axis 304 and the central bushing axis 316. The axle receiver portion 320 includes a recessed area 332 with an inner peripheral surface 334 that extends less than 360° about the lateral axis 304. The inner peripheral surface 334 is directly abutted against the axle beam 302.

As shown in FIGS. 13 and 14, the first axle wrap 312 includes an integrally formed spring seat portion 336 for supporting a spring element, such as an air spring for example, and an axle receiver portion 338. The axle receiver portion 338 includes a recessed area 340 with an inner peripheral surface 342 that extends less than 360° about the lateral axis 304. The inner peripheral surface 342 is directly abutted against the axle beam 302.

The first axle wrap 312 includes a first window weld area 346 formed within the axle receiver portion 338. The second axle wrap 310 includes a second weld area 344 formed within the axle receiver portion 320. The first 312 and second 310 axle wraps are first welded to each other, and then are subsequently welded to the axle beam 302 via the first 346 and second 344 window weld areas. The bushing tube 314 is then welded to the second axle wrap 310.

The position of the bushing tubes 314 for each of the first 306 and second 308 trailing arm assemblies should be tightly controlled, thus the bushing tubes 314 are welded on last to compensate for any misalignment in the suspension. This eliminates the need for machining the axle beam 302, which allows the use of a thinner wall axle tube.

Figure 16:
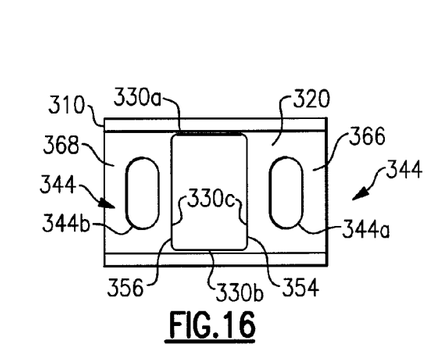
FIG. 16 is an end view of another cast component from the trailing arm assembly of FIG. 14.

As shown in FIG. 15, the first weld area 346 is a single window weld 346a. As shown in FIGS. 14 and 16, the second window weld area 344 includes a first window weld 344a and a second window weld 344b. The first 344a and second 344b window welds are laterally spaced apart from each other along the lateral axis 304 and are positioned on laterally opposite sides of the arm body 330. When attached to the axle beam 302, the single window weld 346a of the first axle wrap 312 is positioned generally between the first 344a and second 344b window welds.

The use of two window welds on opposite sides of the arm body 330 reduces a twisting moment that could be generated by having a single offset window weld area on the second axle wrap 310. The first axle wrap 312, with the spring seat portion 336, has a centrally positioned window weld. This unique configuration provides flexibility of changing from a top mount suspension to a low mount suspension by simply using a different rear casting for the first axle wrap 312. The front casting for the second axle wrap 310 and the bushing tube 314 can be used for either configuration.

The arm body 330 of the second axle wrap 310 is rectangular, box-shaped body that is defined by an upper wall 330a, a lower wall 330b, and two side walls 330c. The arm body 330 is generally hollow, thus forming a box-shape structure. The side walls 330c extend from opposing side edges of the upper wall 330a to a respective side edge of the lower wall 330b. Thus, the side walls 330c are parallel to each other, and spaced apart from each other, in a direction along the lateral axis 304.

The trailing arm and axle assembly 300 includes a side shock absorber mount, shown generally at 350 in FIG. 13. The side shock absorber mount 350 is formed within the side walls 330c of each of the front suspension arm wraps 310. The side shock absorber mount 350 comprises a bore 352 that extends from one side wall 330c to the opposite side wall 330c. The side walls 330c are further defined as an inboard side wall 354 and an outboard side wall 356 (FIGS. 13 and 16). The bore 352 has a larger diameter at the outboard side wall 356 than at the inboard side wall 354.

The outboard side wall 356 includes an enlarged counter bore area 358 and the inboard side wall 354 includes a boss portion 360 that extends inwardly from the inboard side wall 354 toward a vehicle center. The boss portion 360 includes a threaded mount interface to which a shock absorber mount portion is secured in a manner similar to that shown in FIG. 12. Optionally, shock absorber mount portions from the other examples could also be used with the configuration of FIGS. 13-16. Further, the side shock absorber mount 350 could be used with the other embodiments set forth in FIGS. 1-12.

The axle receiver portion 338 of the first axle wrap 312 comprises a C-shaped portion that surrounds a portion of the lateral axis 304. Opposing lateral end portions 348 (FIG. 15) of the axle receiver portion 338 extend laterally beyond the side walls 330c of the arm body 330, i.e. the opposing lateral end portions 348 extend axially beyond the inboard 354 and outboard 356 side walls of the arm body 330 in a direction along the lateral axis 304. The single window weld 346a is positioned centrally between the lateral end portions 348.

The axle receiver portion 320 of the second axle wrap 310 also comprises a C-shaped portion that surrounds a portion of the lateral axis 304. As shown in FIG. 16, the axle receiver portion 320 includes an inboard portion 366 that extends laterally inwardly away from the inboard side wall 354, and an outboard portion 368 that extends laterally outwardly away from the outboard side wall 356. The first window weld 344a is formed within the inboard portion 366 of the axle receiver portion 320, and the second window weld 344b is formed within the outboard portion 368 of the axle receiver portion 320. Thus, the first window weld 344a is spaced inboard of the inboard side wall 354 and the second window weld 344b is spaced outboard of the outboard side wall 356.

The subject invention provides lightweight and high strength trailing arms 20, 82, 206, 208, 306, 308 that have fewer components, and which are less expensive and less time consuming to assemble compared to prior designs.

Although an example embodiment of this invention has been disclosed, a worker of ordinary skill in this art would recognize that certain modifications would come within the scope of this invention. For that reason, the following claims should be studied to determine the true scope and content of this invention.

What is claimed is:

1. A trailing arm assembly for a suspension comprising:
a first axle wrap defining a first window weld area, said first axle wrap including a first axle receiver portion and a spring seat;
a second axle wrap including an arm body with a bushing receiver portion formed at one arm end and a second axle receiver portion formed at an opposite arm end, said second axle wrap defining a second window weld area comprising a first window weld positioned on one lateral side of said arm body and a second window weld positioned on an opposite lateral side of said arm body; and
a bushing tube mounted to said bushing receiver portion.

2. The trailing arm assembly according to claim 1 wherein said first axle receiver portion defines a first inner surface formed to generally surround a portion of an axle component and said second axle receiver portion defines a second inner surface formed to generally surround a remaining portion of the axle component.

3. The trailing arm assembly according to claim 2 wherein said first and second axle wraps are welded to each other to substantially surround an outer perimeter of the axle component prior to being welded to the axle component at said first and second weld areas.

4. The trailing arm assembly according to claim 3 wherein said bushing tube is welded to said bushing receiver portion subsequent to said first and said second axle wraps being welded to the axle component.

5. The trailing arm assembly according to claim 1 wherein said first axle wrap and said second axle wrap comprise cast components having a cast surface structure, and wherein said spring seat is integral with said first axle wrap to form a first single-piece component, and wherein said bushing receiver portion and said second axle receiver portion are integral with said second axle wrap to form a second single-piece component.

6. The trailing arm assembly according to claim 5 wherein said bushing receiver portion includes a circular bore defined by an inner circumferential surface that surrounds a bushing axis, said inner circumferential surface being in direct abutting engagement with an outer surface of said bushing tube.

7. The trailing arm assembly according to claim 5 wherein said arm body comprises a box-shaped structure having an upper wall, a lower wall, an inboard side wall extending from one edge of said upper wall to one edge of said lower wall, and an outboard side wall extending from an opposite edge of said upper wall to an opposite edge of said lower wall.

8. The trailing arm assembly according to claim 7 wherein said first axle receiver portion defines a first inner surface formed to generally surround a portion of an axle component and said second axle receiver portion defines a second inner surface formed to generally surround a remaining portion of the axle component, said first and said second axle wrap portions cooperating to define a lateral axis when attached to each other, and wherein said second axle receiver portion includes an inboard portion that extends inwardly away from said inboard side wall in a direction along said lateral axis and an outboard portion that extends outwardly away from said outboard side wall in an opposite direction along said lateral axis.

9. The trailing arm assembly according to claim 8 wherein said first window weld is formed within said inboard portion of said second axle receiver portion and said second window weld is formed within said outboard portion of said second axle receiver portion.

10. The trailing arm assembly according to claim 9 wherein said first window weld area comprises a single window weld that is positioned axially between said first and said second window welds.

11. The trailing arm assembly according to claim 10 wherein said arm body includes a shock absorber side mount portion that is formed to extend through said inboard and said outboard side walls.

12. The trailing arm assembly according to claim 11 wherein said shock absorber side mount portion includes a frustro-conical recess extending into at least one of said inboard and said outboard side walls.

13. The trailing arm assembly according to claim 1 wherein said bushing tube is integrally formed as one-piece with said bushing receiver portion.

14. An axle and suspension assembly comprising:
a tubular axle member defining a lateral axis;
a first trailing arm assembly supported on said tubular axle member;
a second trailing arm assembly supported on said tubular axle member, said second trailing arm assembly being laterally spaced from said first trailing arm assembly along said lateral axis; and
wherein said first and said second trailing arm assemblies each include:
a first axle wrap defining a first window weld area, said first axle wrap comprising a first single-piece component that includes a first axle receiver portion and a spring seat,
a second axle wrap comprising a second single-piece component that includes an arm body with a bushing receiver portion formed at one arm end and a second axle receiver portion formed at an opposite arm end, said second axle wrap defining a second window weld area comprising a first window weld positioned on one lateral side of said arm body and a second window weld positioned on an opposite lateral side of said arm body, and
a bushing tube mounted to said bushing receiver portion.

15. The axle and suspension assembly according to claim 14 wherein said bushing tube defines a bushing axis of rotation parallel to said lateral axis and wherein said bushing receiver portion of said second axle wrap includes a bore defined by an inner circumferential surface that completely surrounds said bushing axis of rotation, said inner circumferential surface being in direct abutting contact with an outer circumferential surface of said bushing tube.

16. The axle and suspension assembly according to claim 15 wherein said arm body comprises a box-shaped structure having an upper wall, a lower wall, an inboard side wall extending from one edge of said upper wall to one edge of said lower wall, and an outboard side wall extending from an opposite edge of said upper wall to an opposite edge of said lower wall, and wherein said second axle receiver portion includes an inboard portion that extends inwardly away from said inboard side wall in a direction along said lateral axis and an outboard portion that extends outwardly away from said outboard side wall in an opposite direction along said lateral axis.

17. A method of attaching a trailing arm assembly to an axle component comprising:
(a) providing a first single-piece component by casting a first axle wrap to have a first axle receiver portion integrally formed with a spring seat, and providing a second single-piece component by casting a second axle wrap to have an arm body with a second axle receiver portion integrally formed at one end of the arm body and a bushing receiver portion integrally formed at an opposite end of the arm body;
(b) welding the first and second single-piece components to each other;
(c) welding the first single-piece component to an axle component via a first window weld;
(d) welding the second single-piece component to the axle component via a second window weld and a third window weld such that the first and second single-piece components substantially surround an outer perimeter of the axle component, the second and the third window welds being located on laterally opposite sides of the arm body from each other; and
(e) attaching a bushing tube to the bushing receiver portion.

18. The method according to claim 17 including performing step (b) prior to steps (c) and (d), and performing step (e) subsequent to steps (c) and (d).

19. The method according to claim 17 wherein the bushing tube defines a bushing axis of rotation and including the steps of providing the bushing receiver portion with a bore having an inner circumferential surface that completely surrounds the bushing axis of rotation, and abutting an outer circumferential surface of the bushing tube directly against the inner circumferential surface of the bore.

20. The method according to claim 19 including providing the arm body as a box-shaped structure having an upper wall, a lower wall, an inboard side wall extending from one edge of the upper wall to one edge of the lower wall, and an outboard side wall extending from an opposite edge of the upper wall to an opposite edge of the lower wall, and providing the second axle receiver portion with an inboard portion that extends inwardly away from the inboard side wall in a direction along the lateral axis and an outboard portion that extends outwardly away from the outboard side wall in an opposite direction along the lateral axis, and including forming the second window weld in the inboard portion and forming the third window weld in the outboard portion.

* * * * *